May 4, 1948.                     K. RATH                     2,441,035
VARIABLE FREQUENCY CONTINUOUS BALANCE TRANSLATION SYSTEM
Original Filed Feb. 1, 1944

INVENTOR

Patented May 4, 1948

2,441,035

UNITED STATES PATENT OFFICE 2,441,035

VARIABLE FREQUENCY CONTINUOUS BALANCE TRANSLATION SYSTEM

Karl Rath, New York, N. Y., assignor to Radio Patents Corporation, New York, N. Y., a corporation of New York Original application February 1, 1944, Serial No. 520,636. Divided and this application June 26, 1947, Serial No. 757,197

8 Claims. (Cl. 177—351)

This application is a division of application Serial No. 520,636, filed February 1, 1944, entitled Self-balancing translation system, now matured into U. S. Patent No. 2,423,616, dated July 8, 1947.

The present invention relates to self-balancing or follow-up type translation systems also known as torque amplifiers, for converting variations of an electric or other magnitude into corresponding movements of or variations of energy in a secondary or output device, such as an indicator, recorder, control mechanism or the like.

Known arrangements of this type comprise essentially a primary or leader element such as a sensitive galvanometer for producing a movement in proportion to variations of a weak electric current, a relatively heavy secondary or output device such as an electromagnetic indicator or recorder to be operated in response to the input magnitude variations, a balanced electrical network adapted to be unbalanced by an initial response or deflection of the leader element to produce an off-balance output current suitable for energizing said output device and an inverse feedback path between said secondary and leader elements, whereby to restore and maintain an equilibrium condition of the system in such a manner as to result in a continued follow-up relation between said leader and output elements.

Arrangements of this type are especially suited for indicating or recording extremely small electric currents or voltages such as supplied by a thermo-electric couple, a photovoltaic cell or any other source supplying minute amounts of electric current or potential. In order to restore and maintain the balance of the system, there is usually provided an electrical resistance common to the input and output circuits and adapted to produce a compensating potential drop by the output current suitable to buck or balance an initial input current variation and to maintain a condition of electrical equilibrium in the input circuit.

In view of the large ratio between the input and output currents, the balancing or feedback resistance assumes an extremely small value and difficulties may arise in the proper adjustment and maintenance of the balance condition due to slight variations in the circuit constants and other operating parameters of the system. Furthermore, arrangements of this type are limited to the use of an input or leader element which is responsive to an electric current or voltage such as a galvanometer or other electrical instrument.

Accordingly, an object of the present invention is to provide an improved system of the above character in which a substantially increased compensating or balancing current is used, whereby to result in an improved facility of adjustment and maintenance of the balance and stability of the system.

Another object is to provide a system of this character which is not limited to an electrically controlled input or leader element and which may be used in connection with any type of sensitive device actuable in response to both electrical or other magnitude or conditions such as heat, pressure, level, rate of flow and the like.

A further object of the invention is to obtain a balancing effect by purely electrical means, thereby to avoid mechanical elements and couplings and to improve the flexibility and adaptability of the system to suit specific purposes and requirements.

The above and further objects and novel aspects of the invention will become more apparent from the following detailed description taken in reference to the accompanying drawing forming part of this specification and wherein.

Like reference characters identify like parts in the different views of the drawing.

Figure 1:
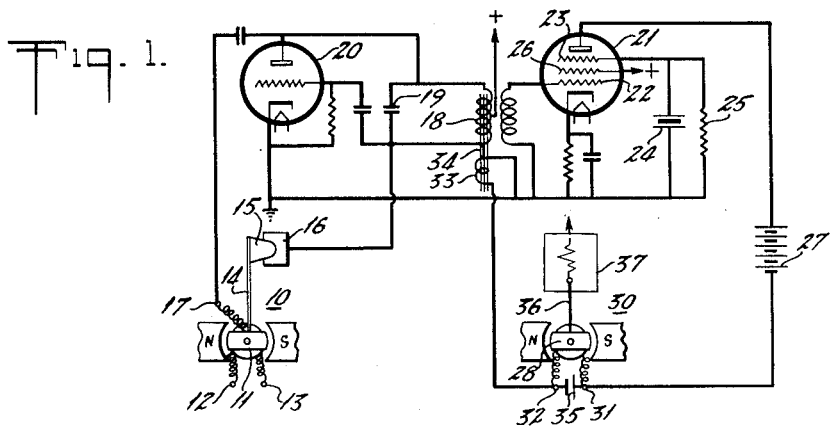
Figure 1 is a schematic circuit diagram of a translation system embodying the principles of the invention.

Referring to Figure 1, there is shown a leader element 10 in the form of a sensitive galvanometer comprising a moving coil 11 rotatably mounted between a pair of magnetic poles N and S and having input terminals 12 and 13 connected thereto through flexible leads such as a pair of torque or balance springs in accordance with the standard design and construction of instruments of this type. The moving coil 11 carries a pointer 14 to the outer end of which is attached a metal vane or electrode 15 arranged to cooperate with a stationary electrode 16 to form a variable electrical condenser. This condenser is connected in shunt relation to the frequency determining resonant impedance means or tank circuit of an auxiliary oscillation generator comprising, in the example shown, an inductance 18 and a condenser 19 in parallel, in such a manner as to control the oscillating frequency in response to a deflection of the electrode 15 in accordance with a varying input current applied to terminals 12 and 13.

The input current applied to the moving coil 11 may be supplied from any suitable source such as a thermo-couple, photo-voltaic cell, pH-indicator or any other source of weak electric energy to be recorded or translated. In order to effect electrical connection to the movable electrode 15, the latter is shown connected to a stationary terminal 17 by way of the pointer 14 and a flexible conductor. The tank or oscillating circuit 18, 19 is operatively associated with any suitable oscillation sustaining device such as a "negative" resistance or regenerative vacuum tube shown at 20 in the drawing to generate sustained electrical oscillations in a manner well understood.

The oscillations having a frequency varying in accordance with the deflection of the moving coil 11, i. e. the instantaneous magnitude of the input current or voltage to be translated or recorded, are applied, if desired by way of an amplifier, to a frequency discriminator or detector of special type described in the following. As is well known, a discriminator is a device capable of producing a direct output current varying in sense and magnitude in proportion to the relative frequency departure of an input oscillation from a fixed or predetermined frequency equal to the resonant frequency of a tuned circuit or equivalent resonant impedance means forming an integral element of the discriminator circuit.

Figure 2:
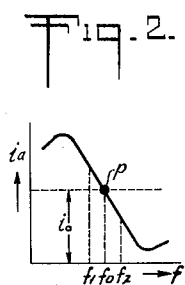
Figure 2 is a graph explanatory of the function and operation of Figure 1.

The general operating characteristic of a discriminator of this type known as phase-shift or resonant discriminator is shown in Figure 2, wherein the discriminator output current $i_a$ is plotted as a function of the input frequency $f$. For a predetermined input frequency $f_0$ corresponding to the resonant frequency of the discriminator, the output current is equal to zero or has a constant value $i_0$ and varies in substantial linear relation within a given deviation range, as the input frequency departs in either sense from the frequency $f_0$, as indicated by the frequencies $f_1$ and $f_2$ below and above the normal or discriminator frequency $f_0$ in the drawing.

Figure 3:
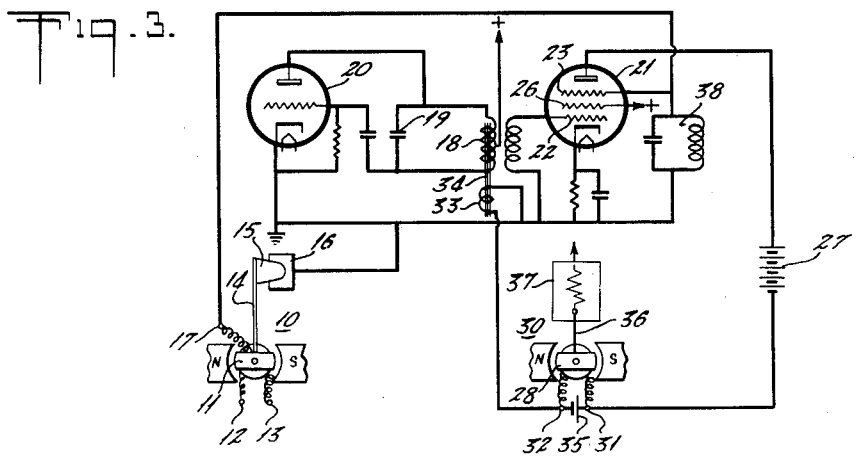
Figures 3 and 4 are diagrams illustrating modified self-balancing arrangements constructed in accordance with the invention.

More specifically, the phase-shift type discriminator or off-balance detector shown in Figure 1 is of the known pentagrid or space-charge type, comprising a vacuum tube 21 having at least an inner control grid 22 near the cathode excited, in the example shown, by the oscillating frequency, an outer control grid 23 near the anode which is connected to ground or cathode through a resonant impedance means, in the example shown a piezoelectric crystal 24 shunted by a high ohmic resistance 25 or equivalent impedance to provide a direct current return from the grid 23 to the cathode. Both control grids 22 and 23 are shielded from each other by an accelerating or screen grid 26, whereby to produce a concentrated electron space-charge or virtual cathode adjacent to the grid 23 in a manner well known and understood by those skilled in the art. In place of the crystal 24, a resonant circuit may be provided, as shown in Figure 3.

The operation of a discriminator of this type is due to the interaction between the control potentials established upon the grids 22 and 23, the latter being excited by space-charged coupling with the electron stream at a phase relative to the oscillating phase upon the grid 22 depending upon the relative frequency departure between the oscillating frequency and the resonant frequency of the crystal 24 or equivalent resonant impedance means. For an input frequency $f_0$ corresponding to the resonant frequency of the crystal 24, the plate current has a normal or quiescent value $i_0$ equal to the steady plate current if one of the control grids were removed or disconnected and determined by the biasing and operating potentials of the tube. If the oscillation frequency deviates in either sense from this normal frequency $f_0$, the plate current increases and decreases linearly in respect to the operating point P in the manner shown in Figure 2 within a given operating range determined by the straight line portion of the curve. The output or anode current of the discriminator tube 21 supplied by a suitable space current source such as a battery 27 is utilized, in the example according to Figure 1, to energize the exciting coil 28 of an output device 30 such as a recorder or equivalent electromagnetic actuating device shown in the drawing.

More specifically, the plate battery 27 is connected between the plate of the discriminator tube 21 and one of the input terminals 31 of the recorder 30, the remaining terminal 32 being connected to cathode or ground through a feedback or balancing coil 33 arranged in inductive relationship with the inductance 18 of the oscillator tank circuit. Both inductances 18 and 33 are mounted upon a common magnetic core 34 in such a manner that the direct current through the control coil 33 varies the degree of magnetisation or saturation of the common iron core and in turn the inductance of the coil 18. In order to neutralize or balance the steady plate current $i_0$ corresponding to the normal or balance condition of the discriminator, a compensating battery 35 or equivalent balancing source is shown connected across the terminals 31 and 32 of the recorder 30 or equivalent output device.

The operation of the system shown in Figure 1 is described in the following: In the normal position, such as shown in the drawing the moving coils 11 and 28 of the galvanometer and the recorder are assumed to be at rest, whereby a central or zero line will be recorded upon the moving chart 37 by the pointer or pen 36 carried by the coil 28, in a manner well understood. If the galvanometer pointer 14 is now deflected, as a result of an input current applied to terminals 11, 13, in one or the other direction, a correponding change in the capacity of the condenser 15, 16 will result in a change of the oscillating frequency. This in turn causes an exciting current either positive or negative to flow in the output circuit of the discriminator and through the moving coil 28 of the recorder, whereby to deflect the pointer or recording pen 36. The same output current passes through the control winding 33. Accordingly, the tank circuit inductance 18 will be changed in such a sense as to counteract the initial capacity variation of the condenser 15, 16, whereby to restore and maintain the original frequency balance. If the galvanometer is deflected in the opposite direction, the discriminator output current flowing through the moving coil 28 will also flow in the opposite direction, whereby to vary the inductance of the tank circuit in an opposite sense so as to again result in a balance or compensation of the initial frequency deviation. At the same time, the pen 36 records the input current variations in the form of a continuous trace or curve upon the moving chart 37. The moving coil 28 may be provided with a pointer cooperating with a suitable indicating scale for direct indication of an input magnitude to be measured or determined. Finally, it is possible to utilize the movement of the coil 28 for operating one or more relay contacts included in a load control circuit, to operate any suitable automatic device or control mechanism.

As a result of the continuous self-balancing action and the practically instantaneous response of the re-balancing or control coil 33, the pointer 36 of the recorder or other output device will follow the movement or displacement of the pointer 14 or equivalent input or leader element substantially instantly and proportionally, thus resulting in a highly sensitive and stable operation of the system.

A follow-up system or torque amplifier of this type has the advantage over normal amplifiers without feedback or re-balancing action that tube and circuit constants enter only as a secondary function of balancing, so that the system is inherently stable and the amplification substantially linear throughout the entire operating range, provided a high response sensitivity at the balance point or stable balance position as insured by the use of a frequency balance and phase-shift type frequency discriminator or off-balance detector in accordance with the invention.

Another advantage of a system according to the invention is due to the fact that, while using oscillation energy as an operating source, the off-balance and re-balancing currents are direct currents, whereby to enable the recorder or other output device to be located at a point remote from the leader-oscillator-discriminator unit. This involves only the transmission of direct current to a remotely controlled location, whereby to enable the use of the system for telemetering or remote control in a most simple and efficient manner.

Still another advantage of the invention is the fact that the input or leader element may be in the form of any device or meter having a movable member controlled either manually or responsive to any variable magnitude such as pressure, heat, rate of flow, level or the like, which do not have to be converted into equivalent electrical energy as in the case of known re-balancing devices utilizing a variable potential drop for balancing an input voltage. Thus, while a galvanometer has been shown as a leader in the drawing for purposes of illustration, it is understood that any of the above-mentioned modifications come within the broader scope and spirit of the invention as set forth in the claims.

Furthermore, in place of the recorder 30 shown as an output device, any equivalent device such as an indicator or control mechanism may be provided operated either directly by the discriminator output current or after further amplification, as is readily understood.

Referring to Figure 3, there is shown a self-balancing system substantially similar to Figure 1, the only difference consisting in the connection of the variable input condenser 15, 16 in parallel to the discriminator resonant impedance means in the form of a parallel-tuned circuit 38 connected between the outer control grid 23 and the cathode of a discriminator tube 21. With an arrangement of this type, substantially the same operating characteristic is obtained as shown in Figure 2, the only difference being a reversal of the phase of the variations of the output current $i_a$ as a function of the input frequency $f$. This phase reversal may be considered by a suitable connection of the moving coil 28 of the recorder or of the re-balancing winding 33, in such a manner as to effect a re-balance in the manner understood from the above. The arrangement according to Figure 3 has the advantage that the oscillator frequency may be maintained at a highly constant value by using a stabilized oscillator embodying a piezoelectric crystal or other known stabilizing means to insure a highly constant oscillating frequency. This in turn will result in an improvement of the overall stability and in turn the sensitivity of the system, as is understood.

Figure 4:
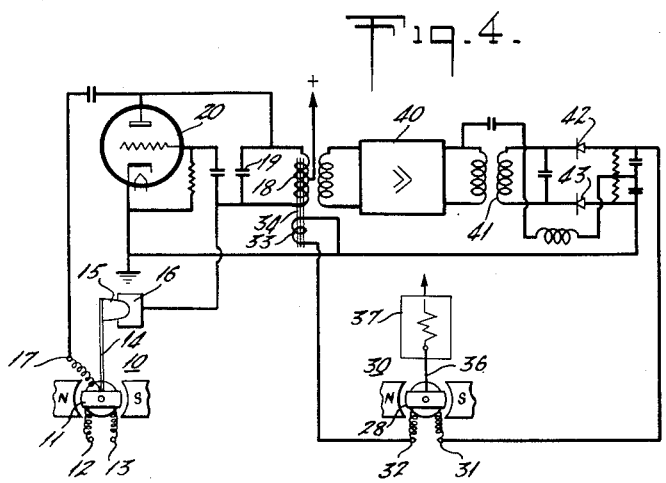

Referring to Figure 4, there is shown a further modification of the invention differing from Figure 1 by the addition of an alternating current amplifier 40 interposed between the oscillator and the discriminator to obtain a discriminator output current of increased magnitude for energizing the recorder or equivalent output device. Moreover, a different type of discriminator generally known as balanced discriminator is shown in Figure 4, comprising a resonant transformer 41 and a pair of rectifiers 42 and 43. As is well known, in a discriminator of this type, the sum and difference of the variably phase shifted primary and secondary voltages of the resonant transformer 41 are separately rectified by the rectifiers 42 and 43 and the rectified voltages combined differentially to produce a direct output current varying substantially as shown in Figure 2. Such a balanced discriminator is characterized by the absence of the normal or steady output current $i_0$ as shown in Figure 2, in which case the balancing battery 35 for the recorder may be omitted, as is understood.

While there have been shown and described a few desirable embodiments of the invention, it is understood that this description is for the purpose of illustration and that various changes in proportion and circuit arrangements, as well as the substitution of equivalent elements and circuits for those herein shown and described may be made without departing from the spirit and scope of the invention as defined in the appended claims. In other words, the invention applies to all kinds of translating and relaying systems, where a change in a measured condition, such as electric energy, temperature, pressure, flow or level is to be translated into a change of pointer position or a change of energy in order to control an operative mechanism which may indicate, record, control or do other desired work. The specification and drawing are accordingly to be regarded in an illustrative rather than limited sense.

I claim:
1. In a system of the character described, a primary element having a movable member; a secondary element having a movable member responsive to and adjustable in proportion to an electric current; a frequency converter comprising a first resonant impedance means, a generator of high frequency voltage comprising a second resonant impedance means having a resonant frequency determinative of the generated frequency, reactive coupling means between said first resonant impedance means and said generator to produce a secondary voltage by said first impedance means having a phase normally at 90° with respect to the generated voltage, and means for combining said secondary voltage with the generated voltage to produce a direct output current varying in sense and magnitude according to the relative frequency departure between the generated frequency and the resonating frequency of said first impedance means; means for controlling said secondary element in accordance with said output current; first reactance means adjustable in response to the movement of said primary element and forming an effective tuning element of said second resonant impedance means; second inductive reactance means also forming an effective tuning element of said second resonant impedance means; a magnetic core provided with a control winding for said inductive reactance means; means for exciting said control winding in accordance with said out- put current to control the generated frequency; the frequency changes effected by said first and second reactance means in response to an initial displacement of said primary element counteracting each other, whereby to maintain a frequency balance between the generated frequency and the resonant frequency of said first impedance means and to cause said secondary element continuously and substantially instantly to follow the movement of said primary element.

2. In a system of the character described, a primary element having a movable member; a secondary element having a movable member responsive to and adjustable in proportion to an electric current; a frequency converter comprising a first resonant impedance means, a generator of high frequency voltage comprising a second resonant impedance means having a resonant frequency determinative of the generated frequency, reactive coupling means between said first resonant impedance means and said generator to produce a secondary voltage by said first impedance means having a phase normally at 90° with respect to the generated voltage, and means for combining said secondary voltage with the generated voltage to produce a direct output current varying in sense and magnitude according to the relative frequency departure between the generated frequency and the resonating frequency of said first impedance means; means for controlling said secondary element in accordance with said output current; first reactance means adjustable in response to the movement of said primary element and forming an effective tuning element of one of said resonant impedance means; second inductive reactance means forming an effective tuning element of said second resonant impedance means; a magnetic core provided with a control winding for said inductive reactance means; means for exciting said control winding in accordance with said output current to control the generated frequency; the frequency changes effected by said first and second reactance means in response to an initial displacement of said primary element counteracting each other, whereby to maintain a frequency balance between the generated frequency and the resonant frequency of said first impedance means and to cause said secondary element continuously and substantially instantly to follow the movement of said primary element.

3. In a system of the character described, a primary element having a movable member; a secondary element having a movable member responsive to and adjustable in proportion to an electric current; a frequency converter comprising a first resonant impedance means, a generator of high frequency voltage comprising a second resonant impedance means having a resonant frequency determinative of the generated frequency, reactive coupling means between said first resonant impedance means and said generator to produce a secondary voltage by said first impedance means having a phase normally at 90° with respect to the generated voltage, and means for combining said secondary voltage with the generated voltage to produce a direct output current varying in sense and magnitude according to the relative frequency departure between the generated frequency and the resonating frequency of said first impedance means; means for controlling said secondary element in accordance with said output current; first reactance means adjustable in response to the movement of said primary element and forming an effective tuning element of said first resonant impedance means; second inductive reactance means forming an effective tuning element of said second impedance means; a magnetic core provided with a control winding for said inductive reactance means; means for exciting said control winding in accordance with said output current to control the generated frequency; the frequency changes effected by said first and second reactance means in response to an initial displacement of said primary element counteracting each other, whereby to maintain a frequency balance between the generated frequency and the resonate frequency of said first impedance means and to cause said secondary element continuously and substantially instantly to follow the movement of said primary element.

4. In a system of the character described, a primary element having a movable member; a secondary element having a movable member responsive to and adjustable in proportion to an electric current; a frequency converter comprising a first resonant impedance means, a generator of high frequency voltage comprising a second resonant impedance means having a resonant frequency determinative of the generated frequency, reactive coupling means between said first resonant impedance means and said generator to produce a secondary voltage by said first impedance means having a phase normally at 90° with respect to the generated voltage, and means for combining said secondary voltage with the generated voltage to produce a direct output current varying in sense and magnitude according to the relative frequency departure between the generated frequency and the resonating frequency of said first impedance means; means for controlling said secondary element in accordance with said output current; a variable condenser element forming an effective tuning element of one of said impedance means and constituted by a first electrode adjustable by said primary element and a fixed electrode cooperating therewith; inductive reactance means forming an effective tuning element of said second impedance means; a magnetic core provided with a control winding for said inductive reactance means; means for exciting said control winding in accordance with said output current to control the generated frequency; the frequency changes effected by said first and second reactance means in response to an initial displacement of said primary element counteracting each other, whereby to maintain a frequency balance between the generated frequency and the resonant frequency of said first impedance means and to cause said secondary element continuously and substantially instantly to follow the movement of said primary element.

5. In a system of the character described, a primary element having a movable member; a secondary element having a movable member responsive to and adjustable in proportion to an electric current; a frequency converter comprising an electronic tube having at least a cathode, an anode, a pair of control guides and a screen grid interposed between said control grids, first resonant impedance means connected between said cathode and one of said control grids, a generator of high frequency voltage comprising a first resonant impedance means having a resonant frequency determinative of the generated frequency and connected between the other of said control grids and said cathode, for producing an anode current varying in sense and magnitude in accordance with the relative frequency departure between the generated frequency and the resonant frequency of said first impedance means; means for controlling said secondary element in accordance with said anode current; first reactance means adjustable in response to the movement of said primary element and forming an effective tuning element of said second resonant impedance means; second inductive reactance means also forming an effective tuning element of said second resonant impedance means; a magnetic core provided with a control winding for said inductive reactance means; means for exciting said control winding in accordance with said anode current; the frequency changes effected by said first and second reactance means in response to an initial displacement of said primary element counteracting each other, whereby to maintain a frequency balance between the generated frequency and the resonant frequency of said first impedance means and to cause said secondary element continuously and substantially instantly to follow the movement of said primary element.

6. In a system of the character described, a primary element having a movable member; a secondary element having a movable member responsive to and adjustable in proportion to an electric current; a frequency converter comprising an electronic tube having at least a cathode, an anode, a pair of control grids and a screen grid interposed between said control grids, first resonant impedance means connected between said cathode and one of said control grids, a generator of high frequency voltage comprising a first resonant impedance means having a resonant frequency determinative of the generated frequency and connected between the other of said control grids and said cathode, for producing an anode current varying in sense and magnitude in accordance with the relative frequency departure between the generated frequency and the resonant frequency of said first impedance means; means for controlling said secondary element in accordance with said anode current; first reactance means adjustable in response to the movement of said primary element and forming an effective tuning element of one of said resonant impedance means; second inductive reactance means forming an effective tuning element of said second resonant impedance means; a magnetic core provided with a control winding for said inductive reactance means; means for exciting said control winding in accordance with said anode current; the frequency changes effected by said first and second reactance means in response to an initial displacement of said primary element counteracting each other, whereby to maintain a frequency balance of said first impedance means and to cause said secondary element continuously and substantially instantly to follow the movement of said primary element.

7. In a system of the character described, a primary element having a movable member; a secondary element having a movable member responsive to and adjustable in proportion to an electric current; a frequency converter comprising an electronic tube having at least a cathode, an anode, a pair of control grids and a screen grid interposed between said control grids, first resonant impedance means connected between said cathode and one of said control grids, a generator of high frequency voltage comprising a first resonant impedance means having a resonant frequency determinative of the generated frequency and connected between the other of said control grids and said cathode, for producing an anode current varying in sense and magnitude in accordance with the relative frequency departure between the generated frequency and the resonant frequency of said first impedance means; means for controlling said secondary element in accordance with said anode current; first reactance means adjustable in response to the movement of said primary element and forming an effective tuning element of said first resonant impedance means; second inductive reactance means forming an effective tuning element of said second impedance means; a magnetic core provided with a control winding for said inductive reactance means; means for exciting said control winding in accordance with said anode current; the frequency changes effected by said first and second reactance means in response to an initial displacement of said primary element counteracting each other, whereby to maintain a frequency balance between the generated frequency and the resonant frequency of said first impedance means and to cause said secondary element continuously and substantially instantly to follow the movement of said primary element.

8. In a system of the character described, a primary element having a movable member; a secondary element having a movable member responsive to and adjustable in proportion to an electric current; a frequency converter comprising an electronic tube having at least a cathode, an anode, a pair of control grids and a screen grid interposed between said control grids, first resonant impedance means connected between said cathode and one of said control grids, a generator of high frequency voltage comprising a first resonant impedance means having a resonant frequency determinative of the generated frequency and connected between the other of said control grids and said cathode, for producing an anode current varying in sense and magnitude in accordance with the relative frequency departure between the generated frequency and the resonant frequency of said first impedance means; means for controlling said secondary element in accordance with said anode current; a variable condenser element forming an effective tuning element of one of said impedance means and constituted by a first electrode adjustable by said primary element and a fixed electrode cooperating therewith; inductive reactance means forming an effective tuning element of said second impedance means; a magnetic core provided with a control winding for said inductive reactance means; means for exciting said control winding in accordance with said anode current; the frequency changes effected by said first and second reactance means in response to an initial displacement of said primary element counteracting each other, whereby to maintain a frequency balance between the generated frequency and the resonant frequency of said first impedance means and to cause said secondary element continuously and substantially instantly to follow the movement of said primary element.

KARL RATH.